(12) United States Patent
Ingram-Tedd et al.

(10) Patent No.: US 10,822,167 B2
(45) Date of Patent: Nov. 3, 2020

(54) STORAGE SYSTEMS AND METHODS

(71) Applicant: OCADO INNOVATION LIMITED, Hatfield (GB)

(72) Inventors: Andrew John Ingram-Tedd, Hatfield (GB); Martyn Lee Bates, Hatfield (GB); Jaroslaw Malinowski, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 111 days.

(21) Appl. No.: 16/083,348

(22) PCT Filed: Mar. 10, 2017

(86) PCT No.: PCT/EP2017/055646
§ 371 (c)(1),
(2) Date: Sep. 7, 2018

(87) PCT Pub. No.: WO2017/153563
PCT Pub. Date: Sep. 14, 2017

(65) Prior Publication Data
US 2019/0092568 A1  Mar. 28, 2019

(30) Foreign Application Priority Data

Mar. 10, 2016 (GB) .................................. 1604095.8

(51) Int. Cl.
*G06F 7/00* (2006.01)
*B65G 1/04* (2006.01)
*B65G 1/06* (2006.01)

(52) U.S. Cl.
CPC ........... *B65G 1/0464* (2013.01); *B65G 1/065* (2013.01)

(58) Field of Classification Search
None
See application file for complete search history.

(56) References Cited

U.S. PATENT DOCUMENTS 5,361,481 A * 11/1994 Lloyd .................. B65G 1/0407
29/407.01
2008/0075569 A1* 3/2008 Benedict .............. B65G 1/0464
414/269

(Continued)

FOREIGN PATENT DOCUMENTS

CN 204642856 U 9/2015
GB 2517264 A 2/2015

(Continued)

OTHER PUBLICATIONS

International Search Report (PCT/ISA/210) dated May 30, 2017, by the European Patent Office as the International Searching Authority for International Application No. PCT/EP2017/055646.

(Continued)

*Primary Examiner* — Yolanda R Cumbess
(74) *Attorney, Agent, or Firm* — Buchanan Ingersoll & Rooney PC

(57) ABSTRACT

A storage system having crash barriers is described. The crash barriers are mounted on separate structures, the structures being mounted adjacent the storage system. The separate structures include tracks such that robotic load handling devices operating on the storage system may over run without causing damage to the main part of the storage system.

8 Claims, 8 Drawing Sheets

(56) References Cited

U.S. PATENT DOCUMENTS

| | | |
|---|---|---|
| 2011/0014017 A1 | 1/2011 | Webster |
| 2015/0168266 A1 | 6/2015 | Keller et al. |
| 2016/0194151 A1 | 7/2016 | Lindbo et al. |

FOREIGN PATENT DOCUMENTS

| | | | |
|---|---|---|---|
| GB | 2518259 A | | 3/2015 |
| JP | 2000-103503 A | | 4/2000 |
| JP | 2000103503 A | * | 4/2000 |
| JP | 2002-265015 A | | 9/2002 |
| KR | 10-1416703 B1 | | 7/2014 |
| WO | 2015/019055 A1 | | 2/2015 |
| WO | 2015/185628 A2 | | 12/2015 |

OTHER PUBLICATIONS

Written Opinion (PCT/ISA/237) dated May 30, 2017, by the European Patent Office as the International Searching Authority for International Application No. PCT/EP2017/055646.

Search Report dated Aug. 16, 2017, by the United Kingdom Intellectual Property Office of in corresponding United Kingdom Patent Application No. GB1703861.3. (7 pages).

\* cited by examiner

STORAGE SYSTEMS AND METHODS

The present invention relates to storage systems and methods. More specifically but not exclusively, it relates to robotic picking systems for picking objects from storage systems having storage bins in stacks, the stacks being located within a grid structure.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are removed from the stacks and accessed from above by load handling devices, removing the need for aisles between the rows and thereby allowing a large number of bins or containers to be stored in a given space.

Methods of handling containers or bins stacked in rows are well known in the art. PCT Publication No. WO2015/185628A (Ocado) describes a storage and fulfilment system in which stacks of bins or containers are arranged within a frame structure. The bins or containers are accessed by load handling devices operative on tracks located on the top of the frame structure. The load handling devices lift bins or containers out from the stacks, multiple load handling devices co-operating to access bins or containers located in the lowest positions of the stack. One form of robotic load handling device is described in PCT Patent Publication No. WO2015/019055 (Ocado) where each robotic load handler only covers one grid space of the frame work structure, thus allowing higher density of load handlers and thus higher throughput for a given sized system.

In some implementations of such container or bin handling systems, there can be a very large number of robotic load handling devices running on a single grid, the grid containing a large number of bins or containers in stacks. The robotic load handling devices may be running on the grid in close proximity to each other and often travelling at speed. Such storage systems are located within buildings that due to their size will often require the framework and grid structure to be built around structural members such as pillars supporting roof structures and other services.

Furthermore, in order to take full advantage of the space within the building, the framework and grid may be built so as to fill the available space, thereby requiring the grid to be located adjacent walls and other structures.

Moreover, for safety reasons in the event of malfunction, the edges of the grid and framework structure may require protection and the robotic load handling devices may need to be prevented from overshooting the edges of the grid.

According to the invention there is provided a storage system comprising: a first set of parallel rails or tracks and a second set of parallel rails or tracks extending transverse to the first set in a substantially horizontal plane to form a grid pattern comprising a plurality of grid spaces; a set of uprights, the uprights and tracks together defining a framework; a plurality of storage containers arranged in stacks beneath the grid spaces, located beneath the rails and within the framework; at least one load handling device disposed on the grid, arranged to move laterally above the stacks on the rails, the load handling device comprising a lifting device arranged to lift one or more containers, or parts thereof, from a stack; wherein the system comprises an additional separate portion of framework comprising uprights with tracks mounted thereon, the additional separate portion of framework being located adjacent the storage system and in contact with the storage system, the additional separate portion of framework being further provided with barrier means, the barrier means extending over the tracks of the additional separate portion such that any load handling device over running the tracks of the storage system will continue to travel on to the tracks of the additional separate portion of framework and impacts the barrier, the forces generated by said impact being directed into the barrier and the separate portion and not being transmitted in to said storage system.

According to the invention there is provided a method of protecting a storage system, the storage system comprising tracks on which load handling devices are operable: providing a separate framework structure comprising tracks; mounting barrier means on the separate framework structure; locating said separate structure adjacent the storage system such that the tracks of the separate structure abut the tracks of the storage system, the barrier means extending toward the main storage system in a direction substantially parallel to the tracks.

Preferred features of the invention are defined in the claims.

In this way, the present invention overcomes the problems of the prior art and provides a safety system ensuring that malfunctioning or over running robotic load handling devices are safely stopped without damage occurring to the main storage system.

Figure 1:
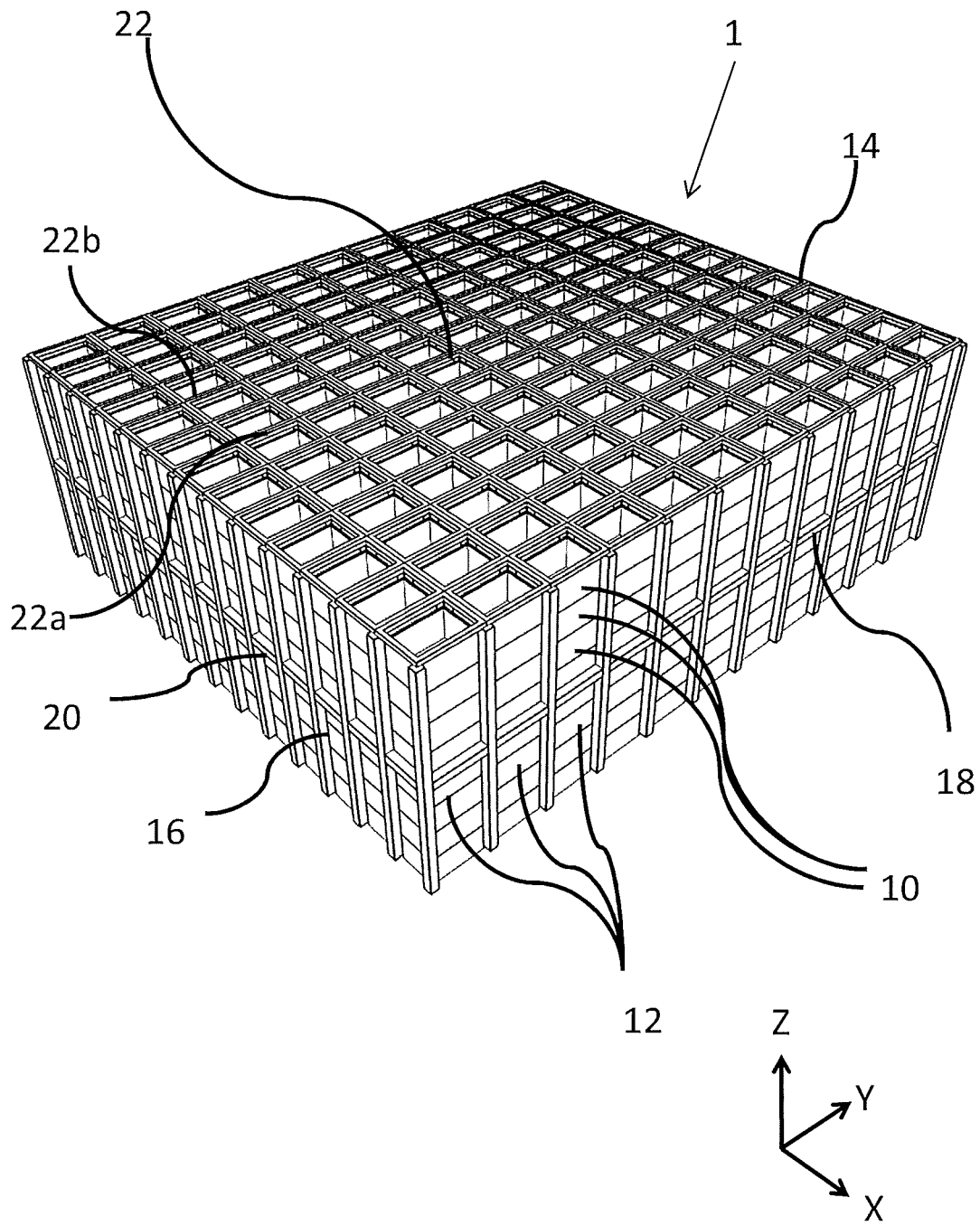
FIG. 1 is a schematic perspective view of a frame structure for housing a plurality of stacks of bins in a known storage system.
Figure 2:
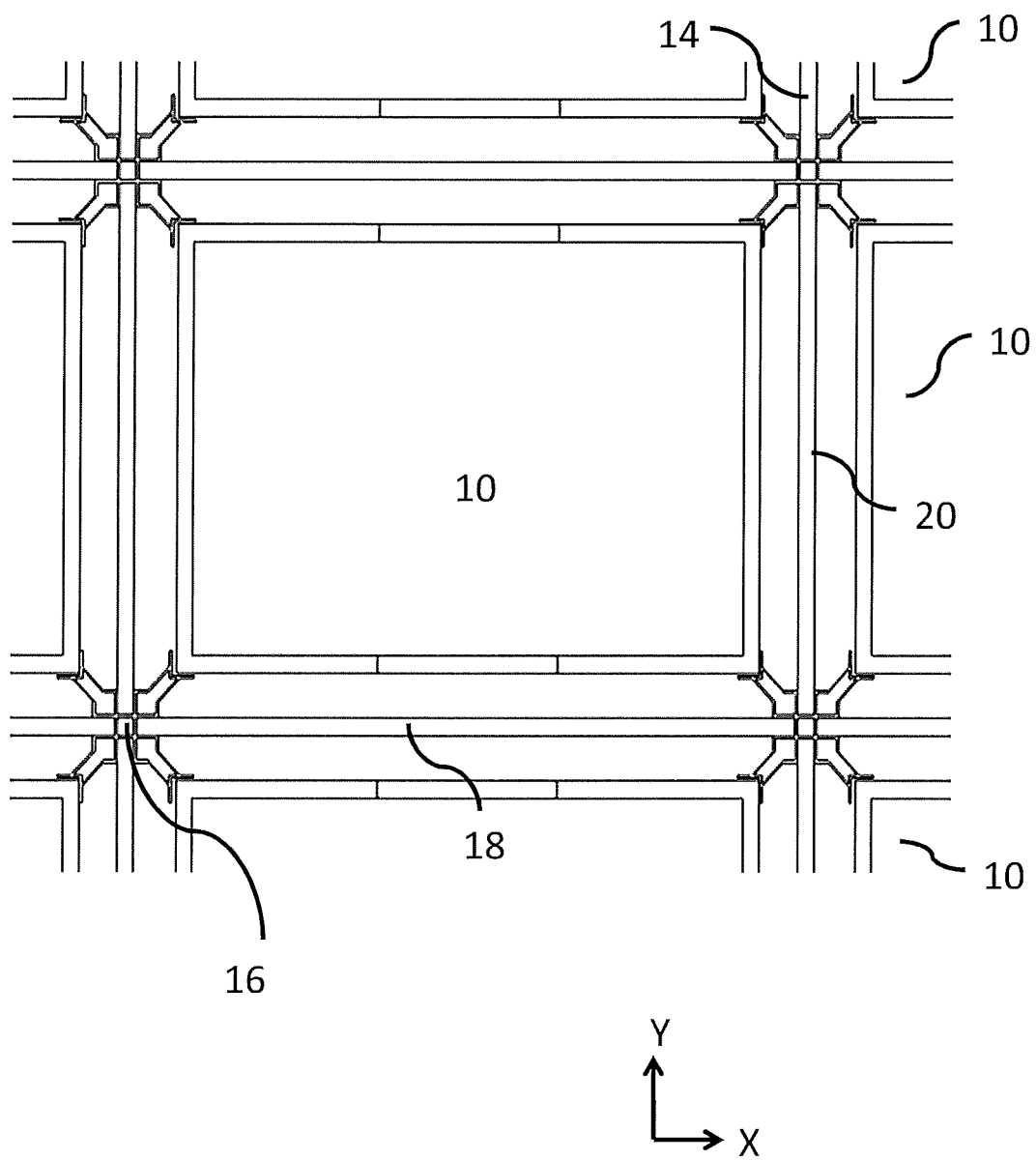
FIG. 2 is a schematic plan view of part of the frame structure of FIG. 1.
Figure 3A:
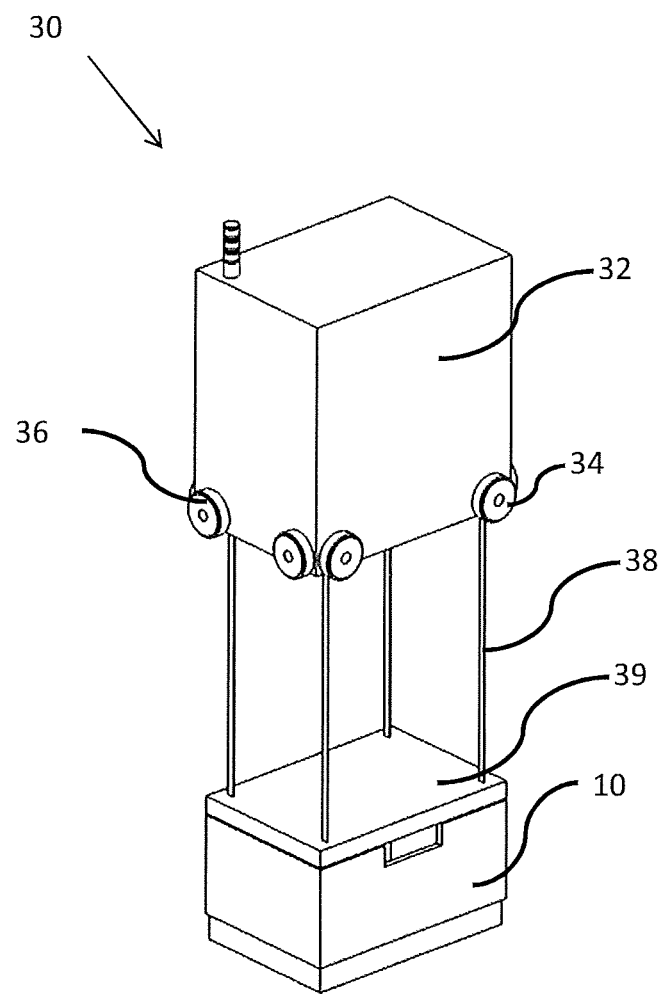
Figures 3B, 3C:
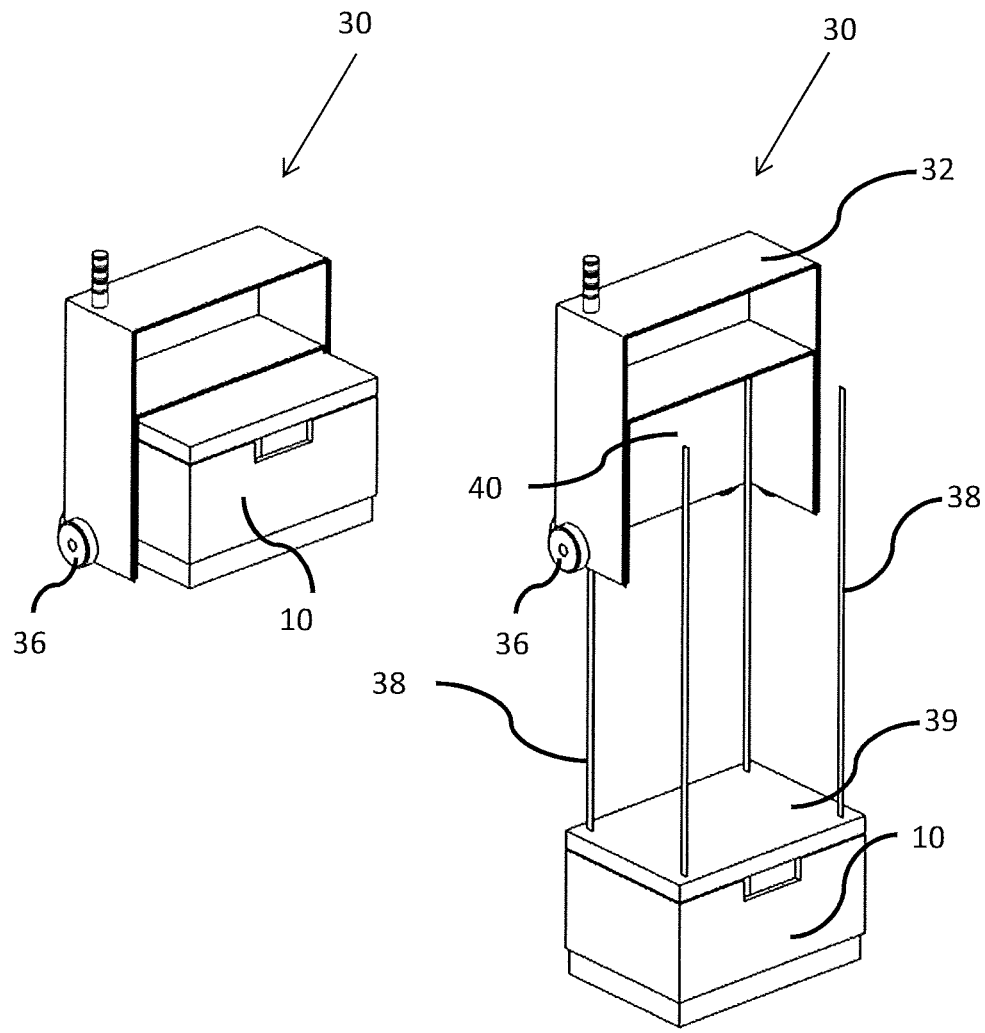
Figure 4:
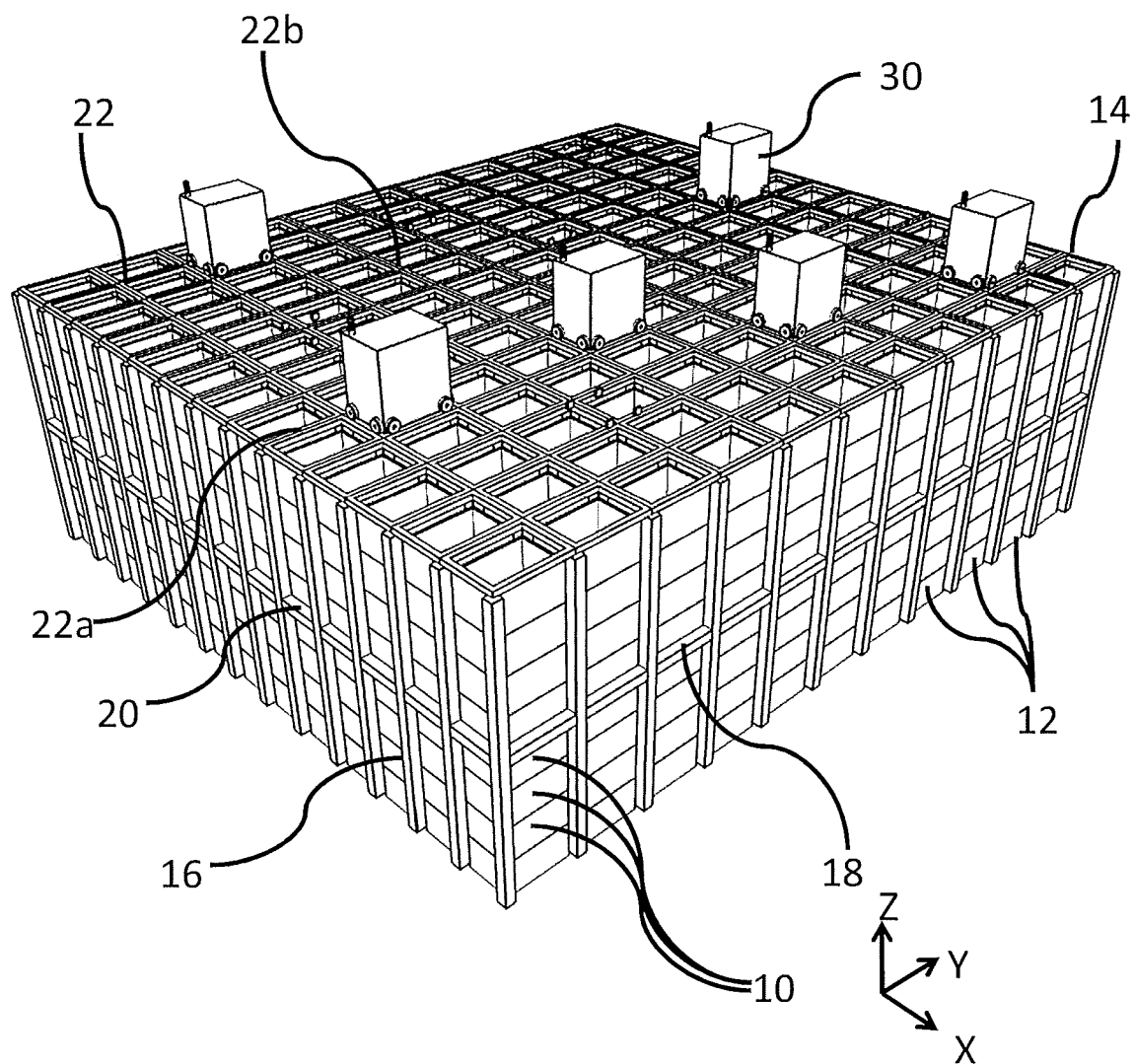
Figure 5:
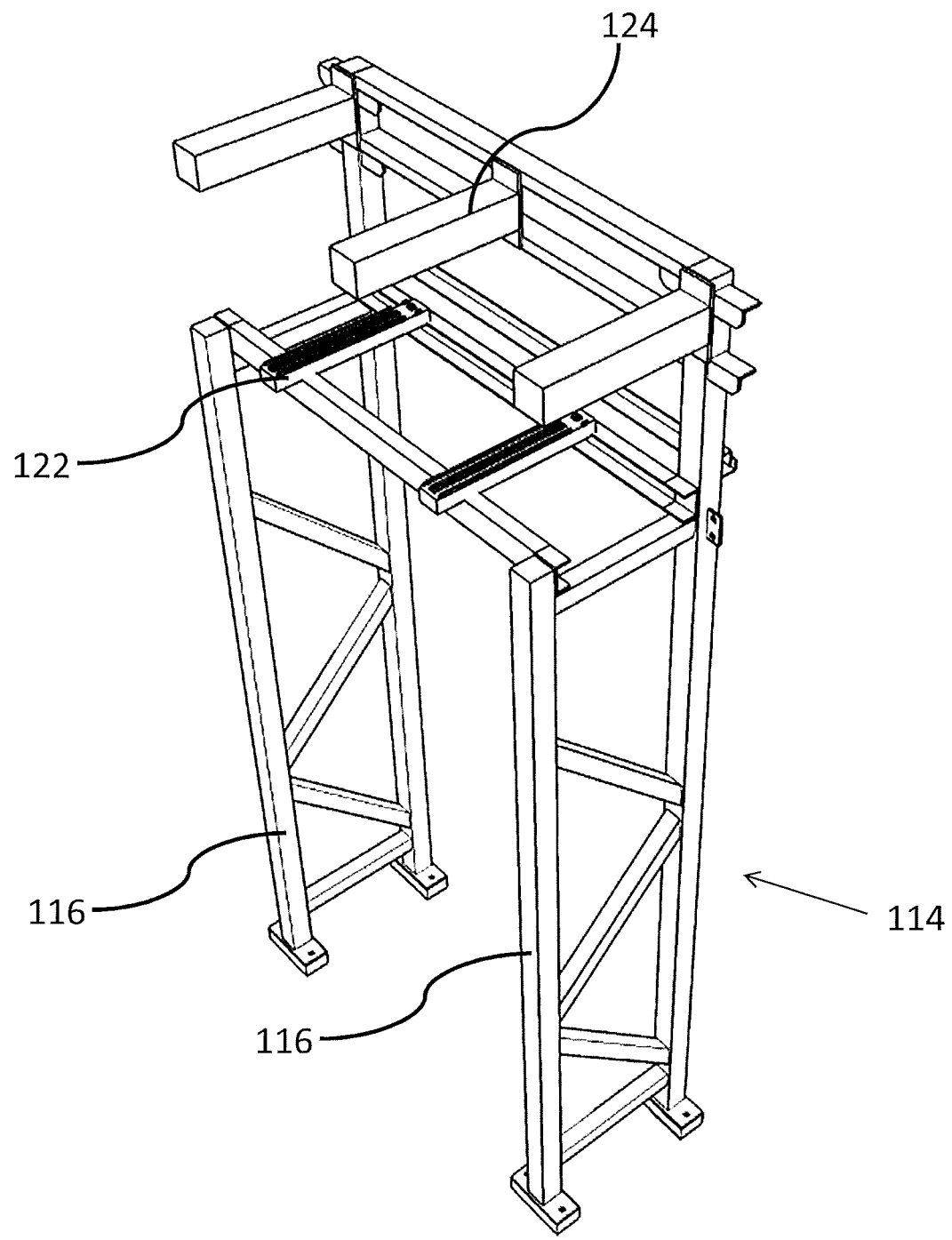
Figure 6:
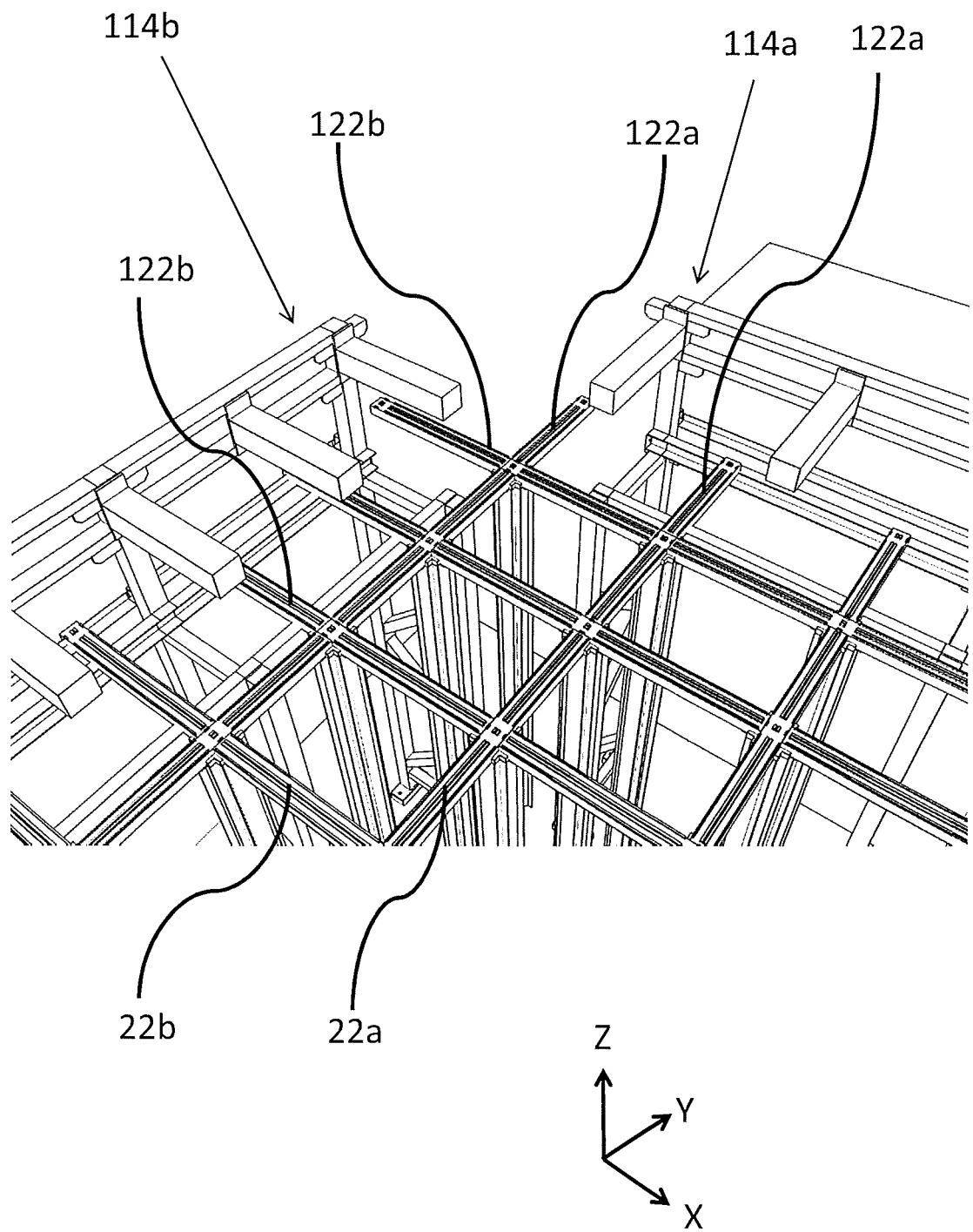
Figure 7:
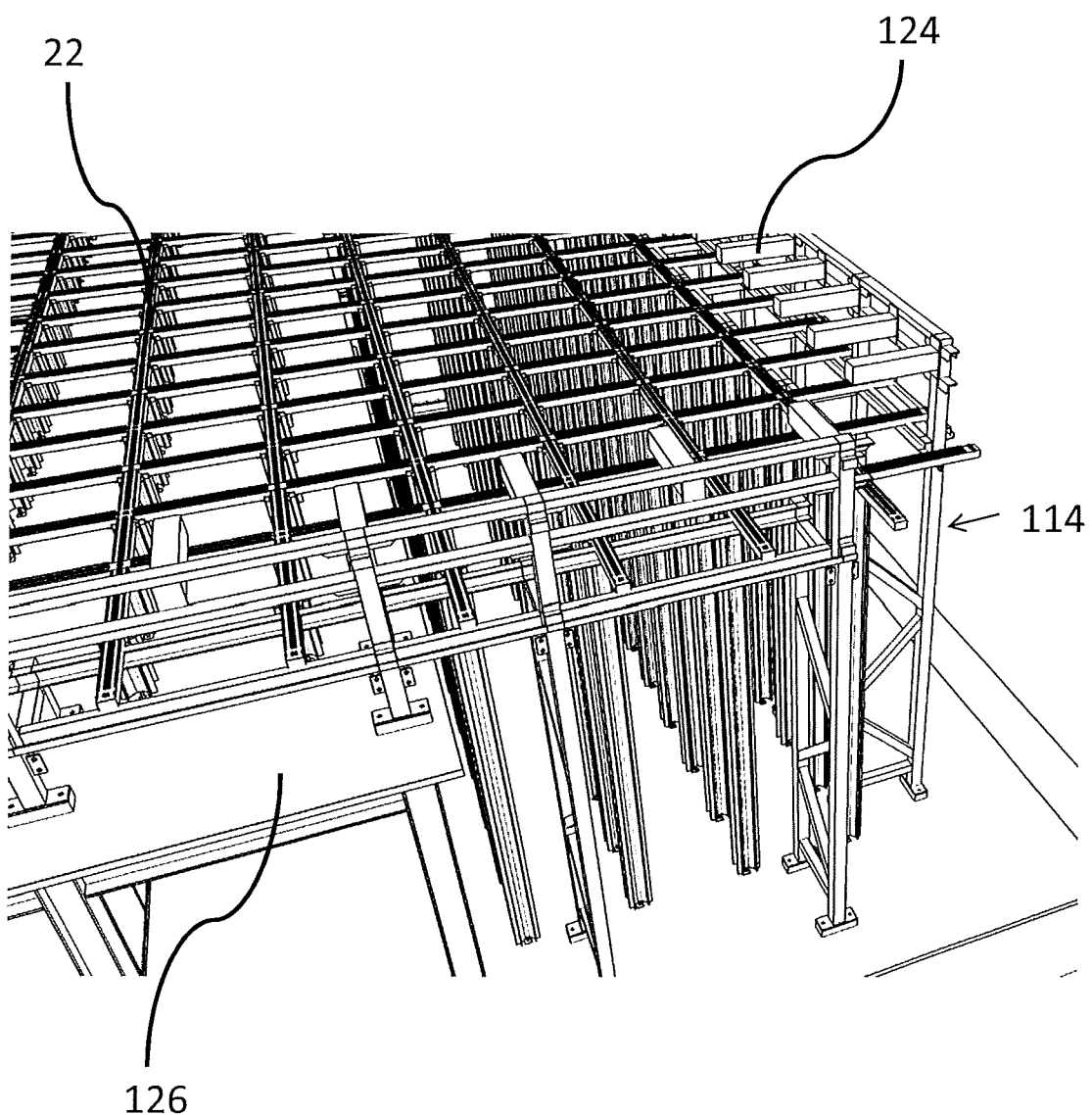

FIGS. 3(a) and 3(b) are schematic perspective views, from the rear and front respectively, of one form of robotic load handling device for use with the frame structure of FIGS. 1 and 2, and FIG. 3(c) is a schematic perspective view of the known load handler device in use lifting a bin;

FIG. 4 is a schematic perspective view of a known storage system comprising a plurality of load handler devices of the type shown in FIGS. 3(a), 3(b) and 3(c), installed on the frame structure of FIGS. 1 and 2, together with a robotic service device in accordance with one form of the invention;

FIG. 5 is a schematic perspective view of a separate portion of framework comprising uprights and tracks in accordance with one form of the invention, the separate portion of framework comprising a crash barrier;

FIG. 6 is a schematic perspective view of two of the separate portions of framework of FIG. 5 in accordance with one form of the invention, the first separate portion being located adjacent a first edge of the storage system of FIGS. 1 to 4 and extending in the X direction, the second separate portion being located adjacent a second edge of the storage system of FIGS. 1 to 4 and extending in the Y direction; and FIG. 7 is a schematic perspective view of the storage system of FIGS. 1 to 4 with the separate portions of framework extending along the X and Y axes of the storage system.

As shown in FIGS. 1 and 2, stackable storage containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product or inventory items 28, and the inventory items within a bin 10 may be identical, or may be of different product types depending on the application. Furthermore, the bins 10 may be physically subdivided to accommodate a plurality of different inventory items 28.

In the description below, bins 10 will be used to denote containers intended for the storage of inventory items 28, whilst delivery containers DT will be used to denote containers filled or intended to be filled to fulfil customer orders placed by customers. It will be appreciated that this terminology is used for ease of reference and explanation within this document. However, it should be noted that the bins 10 and the containers DT may be of the same shape and configuration. Furthermore, delivery containers DT may be stored in bins 10 within the storage system or any part thereof.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14, as shown in FIG. 4 under the control of a centralised control utility (not shown). Each robotic load handling device 30 is provided with lifting means 38 for lifting one or more bins 10 from the stack 12 to access the required products.

The body of the vehicle 32 comprises a cavity 40, the cavity 40 being of a size capable of holding a bin 10. The lifting means 38 comprises winch means and a bin gripper assembly 39. The lifting means lifts a bin 10 from the stack 12 to within the cavity 40 within the body of the vehicle 32.

In this way, multiple products can be accessed from multiple locations in the grid and stacks at any one time.

The robotic load handling devices 30 remove bins 10 containing inventory items 28 (not shown) therein and transport the bins 10 to picking stations (not shown) where the required inventory items 28 are removed from the bins 10 and placed into bins 10 comprising delivery containers DT. It is important to note that a delivery container DT may fit within a bin 10. The bins 10 may comprise inventory items 28 or may comprise delivery containers DT. Furthermore, the delivery containers DT may comprise at least one bag 52, the inventory items 28 being picked directly in to a bag 52 at a pick station (not shown).

The empty bins 10 or the bins comprising delivery containers DT or the bins comprising delivery containers DT and bags 52 may all be stored within the stacks 12. It will be appreciated that all the bins 10 have substantially the same external shape and configuration.

FIG. 4 shows a typical storage system as described above, the system having a plurality of load handling devices 30 active on the grid above the stacks 12.

FIGS. 1 and 4 show the bins 10 in stacks 12 within the storage system. It will be appreciated that there may be a large number of bins 10 in any given storage system and that many different items 28 may be stored in the bins 10 in the stacks 12, each bin 10 may contain different categories of inventory items 28 within a single stack 12.

In one system described above and further in UK Patent Application Number GB1410441.8—Ocado Innovation Limited, hereby incorporated by reference, the storage system comprises a series of bins 10 that may further comprise delivery containers DT with customer orders contained therein or may further comprise bins 10 with inventory items 28 awaiting picking contained therein. These different bins 10 and combinations thereof may be contained in the storage system and be accessed by the robotic load handling devices 30 as described above.

FIG. 5 shows a schematic perspective view of a separate portion of framework 114 comprising uprights 116 and tracks 122 in accordance with one form of the invention, the separate portion of framework 114 also comprising barrier means 124. The barrier means 124 extend toward the main storage system and are substantially parallel to the direction of the tracks 122 in the separate portion of framework 114.

The structure of the separate portion of the framework 114 is attached to the floor of a building (or level within a building) containing the storage system. However, the separate portion of framework 114 is not fixedly attached to the main storage system.

The barrier 124 comprises any material or structure that may act as a crumple zone in the event of an impact from a robotic load handling device that has overrun the tracks of the main storage system due to malfunction or error in the system.

For example, the barrier may comprise a metallic honeycomb type structure, or an inflatable barrier, a barrier formed from any suitable resilient material such as padding or foam or rubber. The barrier may further comprise mesh or wire or tensioned cables or structures or materials. It will be appreciated that any structure, material or device capable of absorbing the forces generated by a load handling device impacting the barrier 124 may be used and need not be limited to the examples given above.

FIG. 6 is a schematic perspective view of two of the separate portions of framework 114 of FIG. 5, the first separate portion 114a being located adjacent a first edge of the storage system of FIGS. 1 to 4 and extending in the X direction, the second separate portion 114b being located adjacent a second edge of the storage system of FIGS. 1 to 4 and extending in the Y direction of the main storage system.

As can be seen in FIG. 6, the tracks 122 of the separate portions of framework 114 do not comprise whole grid squares.

FIG. 7 is a further schematic perspective view of the storage system of FIGS. 1 to 4 with the separate portions of framework extending along the X and Y axes of the storage system. As can be seen in FIG. 7, the separate portions of framework 114 may be supported on a mezzanine structure 126.

In use, the separate framework 114 is positioned adjacent an edge of the main storage system such that the tracks 122 of the separate portion abut the tracks 22 of the main storage system. Suitable resilient material may be located between the tracks 122 and the tracks 22. The edge of the main storage system may be the part of the storage system adjacent the edge of the building in which the system is located. However, it will be appreciated that the separate portion of framework 114 may be positioned any part of the main storage system where the movement of the robotic load handling devices may over run the grid of the main storage system and potentially impact and damage other parts of the building such as structural support members, pillars, walls, partitions and the like.

Should a robotic load handling device malfunction and overrun the main storage system, it will impact the barrier structure 124. As the robotic load handling devices may be travelling up to 4 metres per second and weigh in the region of 200 kg, it will be appreciated that such an impact will generate a substantial force on the barrier and the separate portion of framework 114.

As the separate framework structure 114 is not fixedly attached to the main framework structure 14, the barrier 124 attached to the separate structure 114 absorbs the energy of the impact and may deflect. However, it will be appreciated that the barrier may not absorb all of the energy of the impact and forces may be transmitted to the framework of the separate portion. However, as the separate portion 114 is not attached to the main framework 14, no forces will be transmitted to the main storage system and any damage as a result will be limited to the separate portion of framework 114 which is easily replaceable.

It will further be appreciated that whilst many of the above embodiments are described with reference to a main storage system, this definition is used for clarity purposes within the description. It will be appreciated that there may be several portions of framework within the main storage system, but all may be attached together. The separate portion of framework 114 is distinguished in that it is not fixedly attached to any part of the storage system comprising containers or bins 10 located in stacks 12 beneath the tracks 22.

Whilst the foregoing description refers to a storage system it will be appreciated that the function of the system may not solely be storage of items or goods. For example, the system may be used to store empty bins awaiting items to be placed therein, or bins comprising customer orders temporarily located within the framework as well as containers 10 comprising goods or items being stored.

The invention claimed is:

1. A storage system comprising:
   a first set of parallel rails, and a second set of parallel rails extending transverse to the first set in a substantially horizontal plane to form a grid with a grid pattern, the grid pattern having a plurality of grid spaces;
   a set of uprights, the uprights and the first and second sets of rails together defining a storage system framework;
   a plurality of storage containers arranged in stacks beneath the grid spaces, located beneath the substantially horizontal plane and within the storage system framework;
   at least one load handling device, arranged to move laterally above the stacks on the first and second sets of rails, the load handling device including a lifting device arranged to lift one or more containers, or parts thereof, from a stack; and
   a separately formed portion of framework having uprights located adjacent the storage system framework, and having additional rails arranged to abut the first and second sets of rails; the storage system framework having a barrier means extending over the additional rails of the separately formed portion of framework such that any load handling device when moving beyond the first and second rails of the storage system will continue to travel on to the additional rails of the separately formed portion of framework and impact the barrier, such that forces generated by said impact will be directed into the barrier and the separately formed portion of framework and not into said storage system.

2. The storage system according to claim 1, wherein the barrier means comprises:
   impact absorbent material.

3. The storage system according to claim 1, wherein the barrier means comprises:
   a honeycomb structure.

4. The storage system according to claim 1, wherein the barrier means is inflatable and configured to inflate in response to a remotely located trigger.

5. The storage system according to claim 1, wherein the additional portion of framework abuts the framework of the storage system by an interference means.

6. The storage system according to claim 1, wherein the interference means between the additional portion of framework and the framework of the storage system includes resilient material, wherein the resilient material is rubber or any material capable of absorbing forces on the barrier means generated by an impact.

7. The storage system according to claim 1, wherein the additional portion of framework is disposed adjacent the framework of the storage system at a point in the storage system where a robotic load handling device may impact a structural member external to the storage system.

8. The storage system according to claim 1, wherein the additional portion of framework comprises:
   rails defining an area smaller than a grid space in the storage system.

* * * * *